United States Patent
Horner, Jr. et al.

(10) Patent No.: US 8,119,548 B2
(45) Date of Patent: Feb. 21, 2012

(54) NANOSILVER AS A BIOCIDE IN BUILDING MATERIALS

(75) Inventors: Charles J. Horner, Jr., Belle Mead, NJ (US); Ajay Kumar, Wayne, NJ (US); Kenneth R. Nieradka, Sparta, NJ (US)

(73) Assignee: Building Materials Investment Corporation, Wilmington, DE (US)

(*) Notice: Subject to any disclaimer, the term of this patent is extended or adjusted under 35 U.S.C. 154(b) by 764 days.

(21) Appl. No.: 11/436,450

(22) Filed: May 18, 2006

(65) Prior Publication Data

US 2006/0272542 A1    Dec. 7, 2006

Related U.S. Application Data

(60) Provisional application No. 60/682,252, filed on May 18, 2005.

(51) Int. Cl.
B32B 27/04   (2006.01)
B32B 27/12   (2006.01)
B32B 5/02    (2006.01)

(52) U.S. Cl. .......... 442/123; 442/65; 442/124; 442/153; 442/164; 442/180; 442/394

(58) Field of Classification Search .................... 442/65, 442/123, 124, 153, 164, 180, 394
See application file for complete search history.

(56) References Cited

U.S. PATENT DOCUMENTS

| | | | |
|---|---|---|---|
| 5,441,742 A | 8/1995 | Autant et al. | |
| 5,965,257 A * | 10/1999 | Ahluwalia | 428/357 |
| 6,235,302 B1 | 5/2001 | Mans et al. | |
| 6,342,556 B1 * | 1/2002 | Batdorf et al. | 524/432 |
| 6,379,712 B1 * | 4/2002 | Yan et al. | 424/618 |
| 6,437,021 B1 | 8/2002 | Wettling et al. | |
| 6,579,906 B2 | 6/2003 | Cooper et al. | |
| 6,777,103 B2 | 8/2004 | Merkley et al. | |
| 6,979,491 B2 | 12/2005 | Yan et al. | |
| 7,335,613 B2 * | 2/2008 | Cottrell et al. | 442/123 |
| 2004/0071958 A1 * | 4/2004 | Marx et al. | 428/328 |
| 2005/0003163 A1 * | 1/2005 | Krishnan | 428/190 |
| 2005/0203237 A1 * | 9/2005 | Cornelius Maria Dekkers et al. | 524/450 |
| 2006/0199281 A1 * | 9/2006 | Zhao et al. | 436/524 |
| 2006/0219641 A1 * | 10/2006 | Kepner et al. | 210/723 |
| 2006/0251807 A1 * | 11/2006 | Hong et al. | 427/212 |

* cited by examiner

*Primary Examiner* — Norca L Torres Velazquez
(74) *Attorney, Agent, or Firm* — Sills, Cummis & Gross P.C.

(57) ABSTRACT

Nanosilver for use as a biocide in coated fibrous substrate facers and other construction and/or building substrates, for protection against bacteria (particularly cyanobacteria), fungi, molds, algae and other bio-organisms known to deface and/or adversely affect such building materials. Facers referred to are commonly used in the construction industry as exposed surfaces for insulation and sheathing boards.

32 Claims, 1 Drawing Sheet

NANOSILVER AS A BIOCIDE IN BUILDING MATERIALS

RELATED APPLICATIONS

This application claims the benefit of U.S. Provisional Application No. 60/682,252, filed May 18, 2005.

FIELD OF THE INVENTION

The present invention relates to the use of nanometals (i.e., nano-sized metals) and metal oxides in building materials. More specifically, the present invention relates to the use of nanometals and/or nanometal oxides and/or ions thereof, in and on components of building materials used in roofing, insulation, siding, decking, accessories (such as drains, vents, gutters, etc.) and other structural and non-structural building materials for protection against bacteria (particularly cyanobacteria), fungi, molds, algae and other bio-organisms known to deface and/or adversely affect such building materials.

BACKGROUND

Metals including silver, copper, mercury, and zinc are known for anti-microbial properties. Bio-organisms treated by these metals do not acquire resistance to the metals. Therefore, the biocidal metals have advantages over the conventional biocides which often cause the selection of biocide-resistant microorganism.

Silver is generally a safe and effective antimicrobial metal. "Nano-Silver" (or nanosilver) refers to silver particles having diameters predominately less than 100 nm. Often, 80% of the silver in nanosilver is in the form of metallic silver nanoparticles. The remaining silver is in ionic form. Because of the small size of the nanosilver particles, the total surface area of the silver exposed is maximized, resulting in the highest possible effect per unit of silver. As a result, 20 ppm concentration of Nano-Silver provides more effectiveness than larger particles of silver solutions, of many times greater concentration.

Nanosilver is commonly known for a number of uses. It serves as an anti-bacterial and deodorizer for fiber, domestic supplies, packing material, cloths, filters, paints, foods, cosmetics and medical products. It prevents electric charging and cut-off of electron waves in electronic products such as cellular phones, computers, semiconductor lines, optical filters, fibers, wallpaper, and glass coatings. Nanosilver is also used as a catalyst, sensor, optical filter, PDP electrode, and LCD Spacer in materials, chemicals, machinery, information and electronic devices.

Recently, Samsung announced that its latest range of refrigerators incorporates a revolutionary new technology called Silver Nano Health System. Since silver has been known for ages to possess natural anti-bacterial properties, utilizing this property of silver, Samsung's range of refrigerators now come with nano scale silver particles coated interior. Ag+ (silver) ions generated from the coating act as a shield against growth of bacterial and other microbial organisms. These ions, due to their inherent anti-bacterial properties, destroy the bacteria and prevent further reproduction, leading to effective protection, of food inside the refrigerator. When silver nano particles come into contact with bacteria, they suppress the respiration of bacteria. This, in turn, adversely affects bacteria's cellular metabolism and inhibits cell growth. The nanosilver in the refrigerator also has strong sterilizing and deodorizing properties which prevent propagation of fungi and bacteria inside refrigerators, helping you enjoy the freshest and cleanest air.

Other nanometals and metallic nanopowders and alloys such as copper, zinc, nickel, cobalt and iron may be substituted for silver and also have similar uses as well as applications in energy, electronics, aerospace and materials.

Although nanometals have truly demonstrated many broad applications, they have not yet been utilized as biocides in building materials. Building materials are subjected to attack by numerous biological organisms, including various molds, fungus and cyanobacteria.

Numerous building materials make use of flexible substrate facers as outer surfaces. A facer is any substrate that is used as an outer surface for insulative or structural materials where such a surface is needed to supply properties not inherent in the material itself. For instance, rigid polyisocyanurate foam roof insulation board, rigid polyisocyanurate foam sheathing board and gypsum sheathing board all use such facers. During the manufacture of such "boards", the chemical precursors of the polyisocyanurate foam core or gypsum core are poured onto the bottom facer and covered by a top facer. In these cases, the facer is necessary for manufacture, as well as providing a surface to nail to, adhere to, walk on, etc. during installation. Traditionally, such facers have been, and still are, cellulose based. However, cellulose based facers have recently come under scrutiny due to rising concerns about mold in buildings.

Due partly to mold issues, the building industry has moved such products toward fiberglass-based facer products. Such products are usually non-woven fiberglass mats coated with either foamed or highly filled latex coatings. While such coated fiberglass mats are less prone to fungus growth, they too can support fungus growth and said coatings are usually formulated with a biocide. Prior art biocides in coated glass facers include organic biocides such as 2-octylthiazol-3-one (Skane M8 from Rohm & Haas Co., Philadelphia, Pa.) or zinc omadine (Arch Chemicals, Inc., Norwalk, Conn.) or others. Such prior art facer biocides have several disadvantages. First they are not active against all organisms that might attach building products, at the dosages used. Second, they can often be lost through volatilization or degradation at the processing temperatures used to manufacture the facer. Thirdly, some have toxicities that may be harmful to workers during facer manufacture. Finally, they require relatively high amounts of biocide to overcome the first two disadvantages and their use can be very expensive.

SUMMARY OF THE INVENTION

The invention provides nanosilver materials which have been shown to impart anti-biocidal and anti-microbial activity to a number of building materials and components used in roofing, insulation, siding, decking, and other structural and non-structural building materials for protection against bacteria (particularly cyanobacteria), fungi, molds, algae and other bio-organisms known to deface and/or adversely affect such building materials.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE FIGURES

These and other features, aspects, and advantages of the apparatus and methods of the present invention will become better understood with regard to the following description, appended claims, and accompanying drawings where:

DETAILED DESCRIPTION

Figure 1:
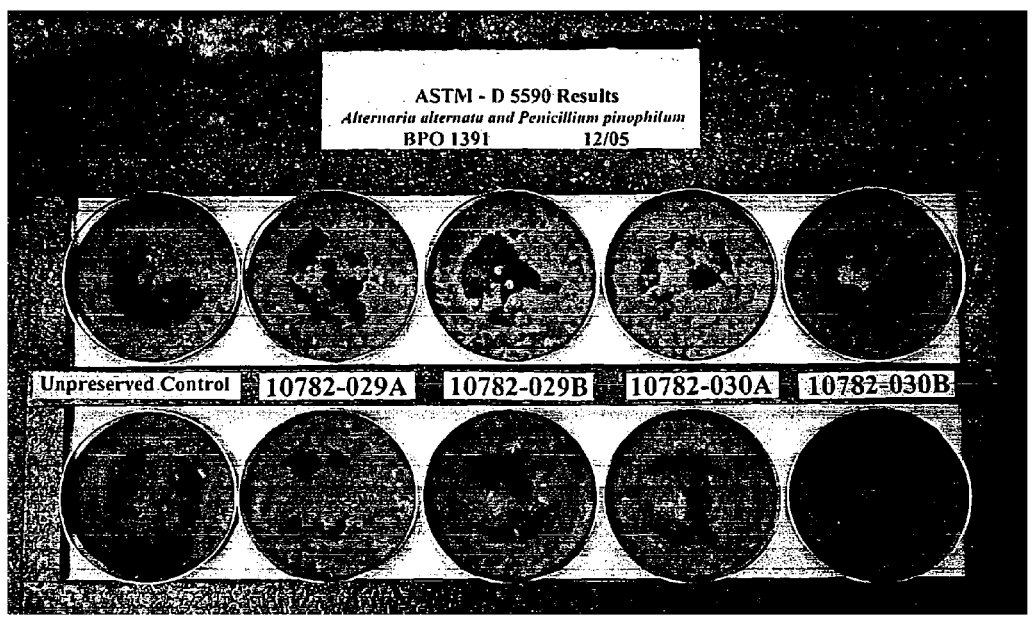
FIG. 1 shows the agar plate samples following a mixed fungal challenge (*Alternaria alternate, Penicillium pinophilim*) using a control and various biocides including the nanosilver formulation of the present invention.

Thus far, use of nanosilver has been mostly aimed at combating bacteria and viruses in indoor applications. While some nanosilver has been added to paints, these have been confined to indoor appliances and surfaces, largely to combat bacteria. In accordance with the present invention, nanosilver is added to the formulation of a coating used on or in a nonwoven substrate of a building material product, to form a fungus or mold resistant product, such as a facer. The coating is also effective in killing and/or preventing the growth of mold fungus, algae or bacteria. The coating may be aqueous or solvent based, but an aqueous latex is preferred. Coating can be filled (such as will one or more filler) or foamed or both, containing common additives known to those skilled in the art.

As recited above, as used herein, a "facer" refers to any substrate that is used as an outer surface for insulative or structural materials where such a surface is needed to supply properties not inherent in the material itself.

The substrates in accordance with the present invention may be, but are not limited to, any non-woven or woven fibrous mat as commonly used in the industry. The substrate may be coated on one or both sides of the substrate or saturated through the substrate. The present invention also includes substrates that are polymeric films, cellulose sheets, metallic foils (such as aluminum) or laminates of some or all the above. The substrates containing a polymeric film may be adhered to a co-substrate. Other substrates contemplated by the present invention include synthetic fibers, polyester, insulation material, sheathing, single-ply roofing membrane, asphalt-containing roof membrane, gypsum board, siding and roof underlayment or housewrap.

Facers produced according to the present invention are intended for use on rigid foamed polyisocyanurate, polyurethane and phenolic roof and sheathing insulation, gypsum board for wall board, sheathing, roofing, shaft-liner, and similar applications. Facers coated with the nanosilver coating of the present invention (on one or both sides) will be effectively protected against most biological organisms that would harm the integrity or esthetics of the product or cause harm to the health of building occupants.

Unlike currently used biocides, the nanosilver biocide in the facer coating according to the present invention would not be lost during the heat of processing. Nor would the nanosilver be used up or dissipated over the life of the product to which the coating is applied.

The nanosilver containing coating according to the present invention does not require the use of substantial quantities in order to function effectively. As such, the nanosilver coating of the present invention has the significant advantage of low cost while not adversely affecting any of the product's other properties. Furthermore, the nanosilver coating used in its normal small quantities, does not discolor the coating, allowing significantly enhanced esthetics.

Advantageously, the nanosilver coating of the present invention does not harm most multicelled organisms and therefore considered fairly non-toxic.

While silver has been described in the biocidal formulation of the present invention, the invention is not limited only to silver and other nanometals and/or nanometal oxides and/or ions thereof, such as, for example, zinc and copper, are also contemplated by the present invention.

Use of nanosilver containing coating on facers can either be done during facer manufacture or as a post-treatment in the field (in use).

In one embodiment, the effective amount of nanosilver level in the biocidal coating is in the range of approximately 0.0001% to approximately 0.01% of the coating by dry weight.

The invention is not limited to the use of nanosilver coating on facers but also includes nanosilver coating on, or as a component of, roofing membranes such as single ply roofing membranes. Such single ply roofing membranes include, but are not limited to, polyvinyl chloride (PVC), thermoplastic olefin (TPO), EPDM and neoprene rubber, and similar membranes. The nanosilver containing coating is preferably applied during factory manufacture of the membrane but also can be applied (sprayed or brushed on) in the field (on the roof). Similarly, the nanosilver containing coating can be applied on an asphaltic built-up roofing (BUR) system.

The nanosilver-containing coating of the present invention is not limited to application on facers and can also be applied to building sidings of all types. Sidings which may be coated with the nanosilver coating of the present invention include, but are not limited to, vinyl, fiber cement, wood, and aluminum sidings. The nanosilver coating may be applied during siding manufacture or after installation.

The nanosilver coating may also be applied to flexible house wraps and roof underlayments. The coating of the present invention may also contain some or all of the following: filler(s), surfactant(s), UV stabilizer(s), thermal stabilizer(s), pigment(s), other co-biocides, fibrous reinforcements, strength additives, compatibilizers, and/or fire retardants.

The nanosilver and other nanometals in accordance with the present invention may be prepared by any methods commonly know to those skilled in the art, including but not limited to, metal powders, crystalline metal nanoparticles, metal complexes or nanometal fixed on zeolite, ceramic, metal or other base particles. Similarly, nanometal oxides may be prepared from metals or metal oxides by known techniques such as, but not limited to plasma generation flame pyrolysis, milling, and sol-gel generation.

EXPERIMENTAL

According to one example of the invention, laboratory samples of facer made from a foamed and filled acrylic latex coated onto one side of a fiberglass mat were prepared using 0.0001, 0.0002 and 0.0003% by dry weight nanosilver. As a control, facer was also prepared using 1.00% by dry weight zinc omadine as biocide. As a further control, a sample was prepared without any biocide. Samples were both air cured and cured at an elevated temperature to test whether or not biocide could be lost during the manufacturing process. All samples were then subjected to ASTM D-5590 test for resistance to fungus. ASTM D-5590 outlines the test method procedures for determining the resistance of paint files and related coatings to fungal defacement by accelerated four-week Agar plate assay. The general procedure set forth in ASTM D-5590 includes the steps of: (1) preparing a suitable specimen for testing, (2) inoculating the specimen with a proper fungal species, (3) exposing the inoculated samples under the appropriate conditions for growth, and (4) providing a schedule and guidelines for visual growth ratings.

Two tests were performed, one exposing samples to *alternaria alternata* and *penicillium* pinophilum and the other test exposing samples to *aureobasidium pullulans*. Test results are summarized in the following table:

| ID #        | Biocide                              | Dosage (dry wt.) | Notes         | Test 1* | Test 2* |
|-------------|--------------------------------------|------------------|---------------|---------|---------|
| 10782-029A  | NanoDynamics ND Silver Dispersion S1-40D | 0.0001%      |               | 4,4     | 4,4     |
| 10782-029B  | NanoDynamics ND Silver Dispersion S1-40D | 0.0001%      | Elevated Heat | 4,4     | 4,4     |
| 10782-030A  | NanoDynamics ND Silver Dispersion S1-40D | 0.0002%      |               | 4,4     | 4,4     |
| 10782-030B  | NanoDynamics ND Silver Dispersion S1-40D | 0.0002%      | Elevated Heat | 4,4     | 4,4     |
| 10782-031A  | NanoDynamics ND Silver Dispersion S1-40D | 0.0004%      |               | 2,2     | 1,1     |
| 10782-031B  | NanoDynamics ND Silver Dispersion S1-40D | 0.0004%      | Elevated Heat | 1,2     | 1,3     |
| 10782-041A  | Arch ZnOmadine                       | 1%               |               | 4,4     | 4,4     |
| 10782-041B  | Arch ZnOmadine                       | 1%               | Elevated Heat | 4,4     | 3,4     |
| Control     | NONE                                 | —                |               | 4,4     | 4,4     |

Test 1 ASTM D5590-*Alternaria alternata* and *penicillium pinophilum*
Test 2 ASTM D5590-*Aureobasidium pullulans*

Rating:
 0 No Growth
 1 Trace of Growth (<10% Coverage)
 2 Light Growth (10-30% Coverage)
 3 Moderate Growth (30-60% Coverage)
 4 Heavy Growth (60-100% Coverage)

Figure 2:
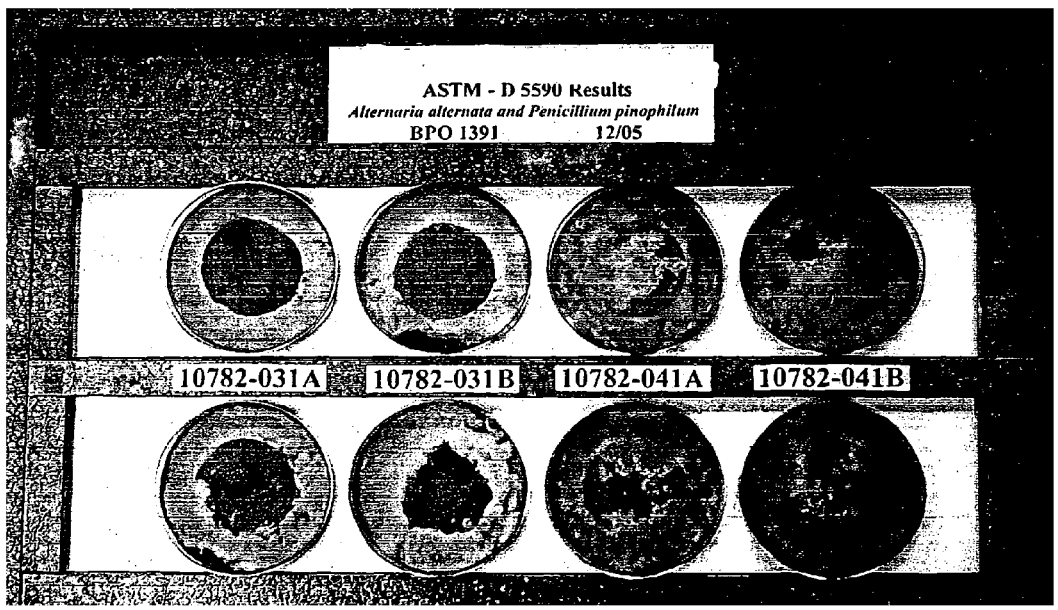
FIG. 2 shows the agar plate samples following a mixed fungal challenge (*Aureobasidium pullulans*) using a control and various biocides including the nanosilver formulation of the present invention.

The agar plate samples for Test 1 are shown in FIG. 1. FIG. 2 illustrates the agar plate samples from Test 2.

While there has been shown and described what is considered to be one preferred embodiment of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A building material product comprising a substrate and a biocidal coating containing approximately 0.0001% to approximately 0.01% by dry weight of nano-sized silver, wherein the substrate comprises a facer or roofing membrane, wherein the coating is aqueous based and wherein the coating also contains a filler.

2. The building material product of claim 1, wherein the coating is a latex.

3. The building material product of claim 2, wherein the latex is an acrylic latex.

4. The building material product of claim 1, wherein the coating is foamed.

5. The building product of claim 1, wherein the coating contains some or all of the following: surfactant(s), UV stabilizer(s), thermal stabilizer(s), pigment(s), other co-biocides, fibrous reinforcements, strength additives, compatibilizers, and/or fire retardants.

6. The building material product of claim 1, wherein the coating is applied to only one side of the substrate.

7. The building material product of claim 1, wherein the coating is applied to both sides of the substrate.

8. The building material product of claim 1, wherein the coating saturates the substrate.

9. The building material product of claim 1, wherein the substrate is a non-woven substrate.

10. The building material product of claim 1, wherein the substrate is selected from the group consisting of fiberglass, cellulose, synthetic fiber, polyester, roof insulation, sheathing, single-ply roofing membrane, asphalt-containing roof membrane, gypsum board, siding and roof underlayment or housewrap.

11. The building material product of claim 1, wherein the substrate contains a polymeric film, either by itself or adhered to a co-substrate.

12. The building material product of claim 1, wherein the nano-sized silver is effective in killing and/or preventing the growth of mold, fungus, algae or bacteria on the facer.

13. The building material product of claim 1, wherein the facer or roofing membrane includes an insulation product.

14. A facer or roofing membrane comprising a substrate coated with a biocidal coating, wherein the coating is aqueous based, and wherein the coating contains: (a) nano-sized silver in an amount of approximately 0.0001% to approximately 0.01% of the coating by dry weight; and (b) a filler.

15. The facer or roofing membrane of claim 14, wherein the coating is latex.

16. The facer or roofing membrane of claim 15, wherein the latex is an acrylic latex.

17. The facer or roofing membrane of claim 14, wherein the coating is foamed.

18. The facer or roofing membrane of claim 14, wherein the coating contains some or all of the following: surfactant(s), UV stabilizer(s), thermal stabilizer(s), pigment(s), other co-biocides, fibrous reinforcements, strength additives, compatibilizers, and/or fire retardants.

19. The facer or roofing membrane of claim 14, wherein the coating is applied to only one side of the substrate.

20. The facer or roofing membrane of claim 14, wherein the coating is applied to both sides of the substrate.

21. The facer or roofing membrane of claim 14, wherein the coating saturates the substrate.

22. The facer or roofing membrane of claim 14, wherein the substrate is a non-woven substrate.

23. The facer or roofing membrane of claim 14, wherein the substrate is selected from the group consisting of fiberglass, cellulose, synthetic fiber, polyester, roof insulation, sheathing, single-ply roofing membrane, asphalt-containing roof membrane, gypsum board, siding and roof underlayment or housewrap.

24. The facer or roofing membrane of claim 14, wherein the substrate contains a polymeric film, either by itself or adhered to a co-substrate.

25. The facer or roofing membrane of claim 14, wherein the nano-sized silver is effective in killing and/or preventing the growth of mold, fungus, algae or bacteria on the facer.

26. The facer or roofing membrane of claim 14, wherein the facer is attached to an insulation material.

27. The facer or roofing membrane of claim 14, wherein the facer is attached to one or both sides of a gypsum board.

28. A building material product comprising:
a substrate chosen from a facer or roofing membrane, and an aqueous based biocidal coating containing: (a) a filler; and (b) approximately 0.0001% to approximately 0.01% by dry weight of one or more nano-sized metals, metal oxides or metal ions selected from the group consisting of silver, zinc, copper, nickel, lead and iron.

29. The building material product of claim 1, wherein the substrate comprises a single ply roofing membrane.

30. The building material product of claim 29, wherein the single ply roofing membrane is chosen from a polyvinyl chloride (PVC) membrane, a thermoplastic olefin (TPO) membrane, an ethylene propylene diene monomer (EPDM) membrane or a neoprene rubber membrane.

31. The building material product of claim 1, comprising a biocidal coating containing approximately 0.0001% to approximately 0.002% by dry weight of nano-sized silver.

32. The building material product of claim 31, comprising a biocidal coating containing approximately 0.0001% to approximately 0.0004% by dry weight of nano-sized silver.

* * * * *